(12) United States Patent
Muller

(10) Patent No.: US 10,933,520 B2
(45) Date of Patent: Mar. 2, 2021

(54) REMOVABLE PROTECTION DEVICE OF A TRANSMISSION SEAL

(71) Applicant: RENAULT s.a.s., Boulogne-Billancourt (FR)

(72) Inventor: Bruno Muller, Le Chesnay (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 180 days.

(21) Appl. No.: 16/071,148

(22) PCT Filed: Jan. 4, 2017

(86) PCT No.: PCT/FR2017/050007
§ 371 (c)(1),
(2) Date: Jul. 19, 2018

(87) PCT Pub. No.: WO2017/125658
PCT Pub. Date: Jul. 27, 2017

(65) Prior Publication Data
US 2019/0366520 A1     Dec. 5, 2019

(30) Foreign Application Priority Data
Jan. 21, 2016 (FR) ..................... 16 50485

(51) Int. Cl.
*F16J 15/32* (2016.01)
*B25B 27/00* (2006.01)
(Continued)

(52) U.S. Cl.
CPC ....... *B25B 27/0028* (2013.01); *F16H 57/029* (2013.01); *F16J 15/3268* (2013.01); *B25B 27/0035* (2013.01)

(58) Field of Classification Search
CPC .................................. F16J 15/32; E25B 27/00
See application file for complete search history.

(56) References Cited

U.S. PATENT DOCUMENTS 4,218,813 A    8/1980  Cather, Jr.
4,815,884 A    3/1989  Halliday, Jr. et al.
(Continued)

FOREIGN PATENT DOCUMENTS

EP    1 240 980 A1    9/2002
FR    2 974 056 A1   10/2012

OTHER PUBLICATIONS

International Search Report dated Feb. 28, 2017 in PCT/FR2017/050007 filed Jan. 4, 2017.
(Continued)

*Primary Examiner* — Vishal A Patel
(74) *Attorney, Agent, or Firm* — Oblon, McClelland, Maier & Neustadt, L.L.P.

(57) ABSTRACT

A removable protection device is for a transmission seal providing tightness between a differential housing and a transmission shaft inserted therein during installation. The removable protection device includes a cylindrical, longitudinally slotted protection ring which is placed under the seal so as to protect same during the insertion of the shaft, a bearing flange for bearing on the housing, connected to the ring and having a radial opening following the slot of the ring, a removal handle attached to the bearing flange, and an abutment projecting axially towards the outside of the housing from the annular flange, so as to halt the insertion of the shaft in a reference position.

4 Claims, 5 Drawing Sheets

(51) Int. Cl.
    *F16H 57/029*    (2012.01)
    *F16J 15/3268*   (2016.01)

(56) References Cited

U.S. PATENT DOCUMENTS

| | | | | |
|---|---|---|---|---|
| 7,284,759 B2 * | 10/2007 | Heldmann | .......... | B25B 27/0028 |
| | | | | 277/351 |
| 8,783,133 B2 * | 7/2014 | Pietras | ................ | B25B 27/0028 |
| | | | | 74/609 |
| 2011/0179620 A1 * | 7/2011 | Harmon | ............... | F16J 15/3268 |
| | | | | 29/426.2 |

OTHER PUBLICATIONS

French Preliminary Search Report dated Aug. 26, 2016 in French Application 1650485 filed Jan. 21, 2016.

* cited by examiner

REMOVABLE PROTECTION DEVICE OF A TRANSMISSION SEAL

BACKGROUND

The present invention relates to the coupling of transmission shafts to motor vehicle differentials.

More precisely, it relates to a removable protection device for a transmission seal providing tightness between a differential case and a transmission shaft inserted therein during mounting, comprising a longitudinally slotted cylindrical protection ring which is introduced under the seal to protect it during the insertion of the shaft, a bearing flange which bears on the case, connected to the ring and having a radial opening following the slot of the ring, and a removal handle attached to the bearing flange.

This invention also relates to a method of mounting a transmission shaft with such a protection device.

Gearboxes frequently encounter oil leaks at their differential outputs. Specifically, during the assembly of vehicles in a body assembly plant, there is a high risk of damage to the transmission seal at the time of mounting the transmission by the operators, which can have the following causes:

an attack on the seal by the splines of the transmission,
poor guidance of the transmission during its positioning, or else
the impacts which can affect the position of the seal and distort said seal.

The publication FR 2974056 discloses a protection tool for the mounting of transmissions. This tool constitutes a removable protection device for a tightness seal for the differential case input, or transmission seal. It takes the form of a circular ring which internally covers the seal to be protected.

The ring is connected to a pull handle allowing the removal of the device after mounting the shaft. The removal of the device is facilitated by the presence of a weakness region or of a slot on the circular ring.

The mounting of transmissions in the presence of such a protector occurs in two phases: approach of the transmission with complete passage of its splines into the protector, withdrawal of the protector, then complete placement of the transmission. No information is provided to the fitter with regard to the fact that the splines have properly passed under the seal and that he can remove the protector. If he removes it too early, the seal can be damaged during the passage of the shaft. If, by contrast, he goes too far in the approach phase of the transmission, the protector is blocked between the gearbox and the transmission in the manner of a vice. It is therefore necessary to partially bring the transmission out again in order to unblock, and remove, the protector. This operation entails a time loss during mounting and also risks damaging the seal.

BRIEF SUMMARY

The aim of the present invention is to alert the operator to the opportune moment for withdrawing the protector.

In this aim, the invention proposes that the device comprises an abutment which projects axially toward the outside of the casing from the annular flange, in order to arrest the insertion of the shaft in a reference position.

Preferably, the reference position is reached when splines of the transmission shaft have passed beyond the transmission seal.

The method of mounting the transmission shaft comprises the following the steps:

placing the protection device under the protective transmission seal,
inserting the transmission shaft as far as a reference position,
removing the protection device by pulling on the handle.

BRIEF DESCRIPTION OF THE DRAWINGS

The present invention will be better understood on reading the following description of two nonlimiting embodiments thereof with reference to the appended drawings, in which.

DETAILED DESCRIPTION

Figure 1:
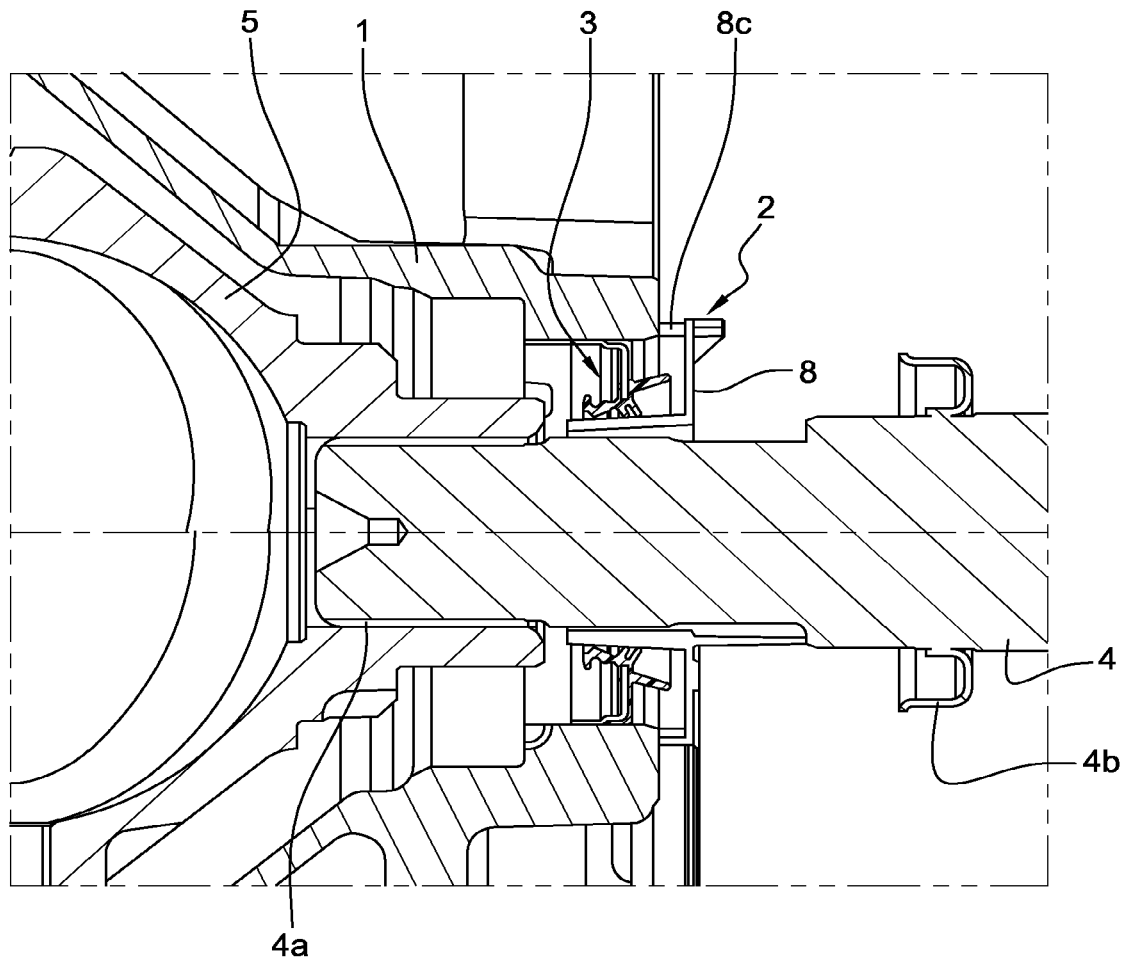
FIG. 1 is a partial section of a differential with the protection device.

FIG. 1 depicts the removable protection device 2 at the input of a gearbox and differential case 1. It protects a transmission seal, here a lip seal 3, providing tightness between the case 1 and the transmission shaft 4.

The shaft 4 has splines 4a at its end. In the diagram, it is partially engaged through the differential housing 5. Its splines 4a have already passed through the protection device 2, but it has still not attained its final engagement position in a hollow ring gear (not shown) within the housing. The shaft 4 bears a collar 4b which comes into bearing contact with the case 1 at the end of mounting (cf. FIG. 3D). The protection device 2 is placed at the opening of the case in order to protect the seal during the passage of the splines 4a.

Figure 2:
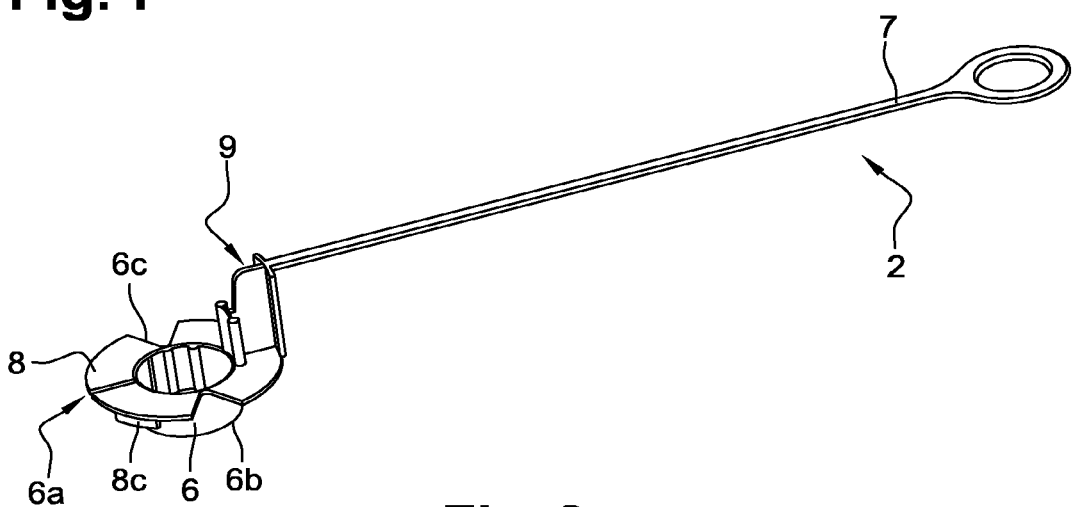
FIG. 2 is an overall view of the proposed device.

FIG. 2 again shows the protection device 2 from FIG. 1. It comprises a longitudinally slotted cylindrical protection ring 6 which is introduced under the seal 3 to protect it during the insertion of the shaft 4, and an annular planar bearing flange 8 which bears flat on the case and which is connected to the ring. The flange 8 has a radial opening (not visible in FIG. 2) (or at least a weakness region) in the continuity of the slot 6a of the ring. It can have lugs 8c in contact with the outer face of the case 1 in the mounting position in FIG. 1. The device also comprises a removal handle 7. The removal handle 7 is attached to the end 9a of an abutment 9 extending from the flange 8. Its first edge 6b, or front edge in the direction of introduction, is free. Its second edge 6c, or rear edge, is integral with the flange 8. The abutment 9 projects axially from the annular flange 8 toward the outside of the case 1, in order to arrest the insertion of the shaft in a reference position. The reference position is reached when the splines 4a of the shaft have passed beyond the transmission seal 3 to be protected. The shaft 4 has a collar 4b visible in particular in FIG. 1 away from the case, and which is pressed into the opening of the case in the mounting position (cf. FIG. 3D). The abutment 9 thus cooperates with the collar 4b in order to define the reference position. It arrests the shaft in translation so as to indicate to the operator the time at which to remove the protection device.

The device 2 is preferably formed by a part molded in one piece, for example of plastic, comprising the ring 6, the planar flange 8, connected to the rear edge thereof, the handle 7 and the abutment 9.

Figure 3A:
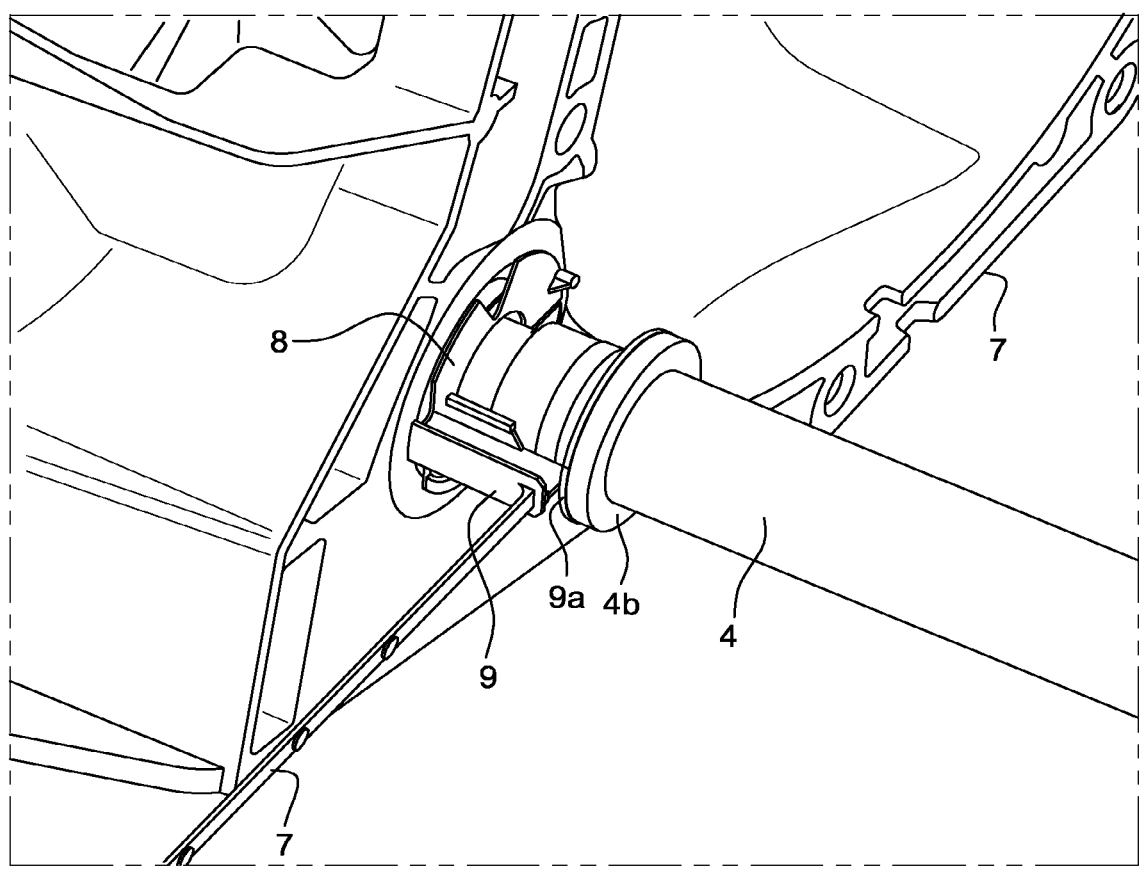
FIGS. 3A to 3D illustrate its removal.

The handle 7 makes it possible to move the protector by rotation, by virtue of the widening of the slot 6a of the ring, and of the opening of the flange 8. In FIG. 3A, the collar 4b of the transmission shaft 4 has met the outer edge 9a of the abutment 9 to which the handle 7 is attached. This is the signal for the operator that the splines 4a of the shaft have passed through the device 2 and no longer present a danger for the lip seal. He can then remove the protection device.

Figure 3B:
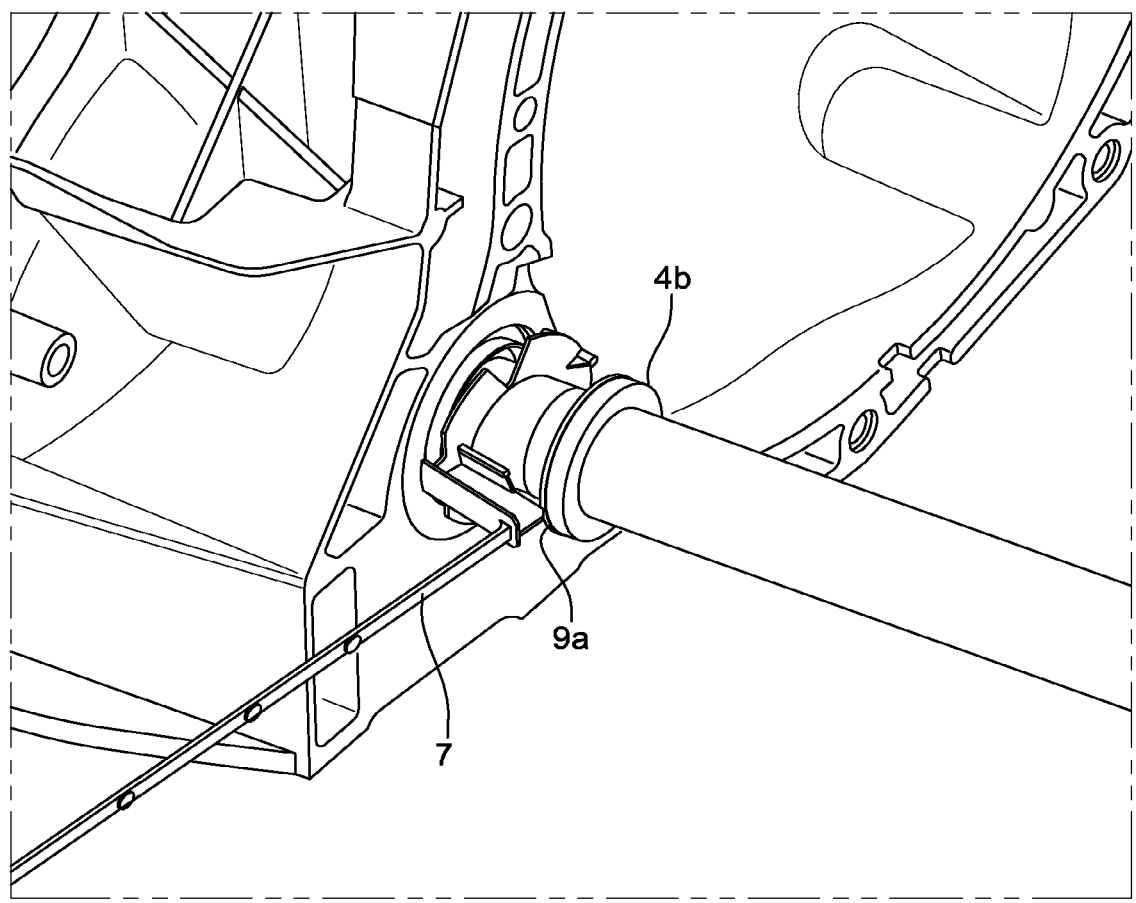

FIG. 3B illustrates the start of this operation.

Figure 3C:
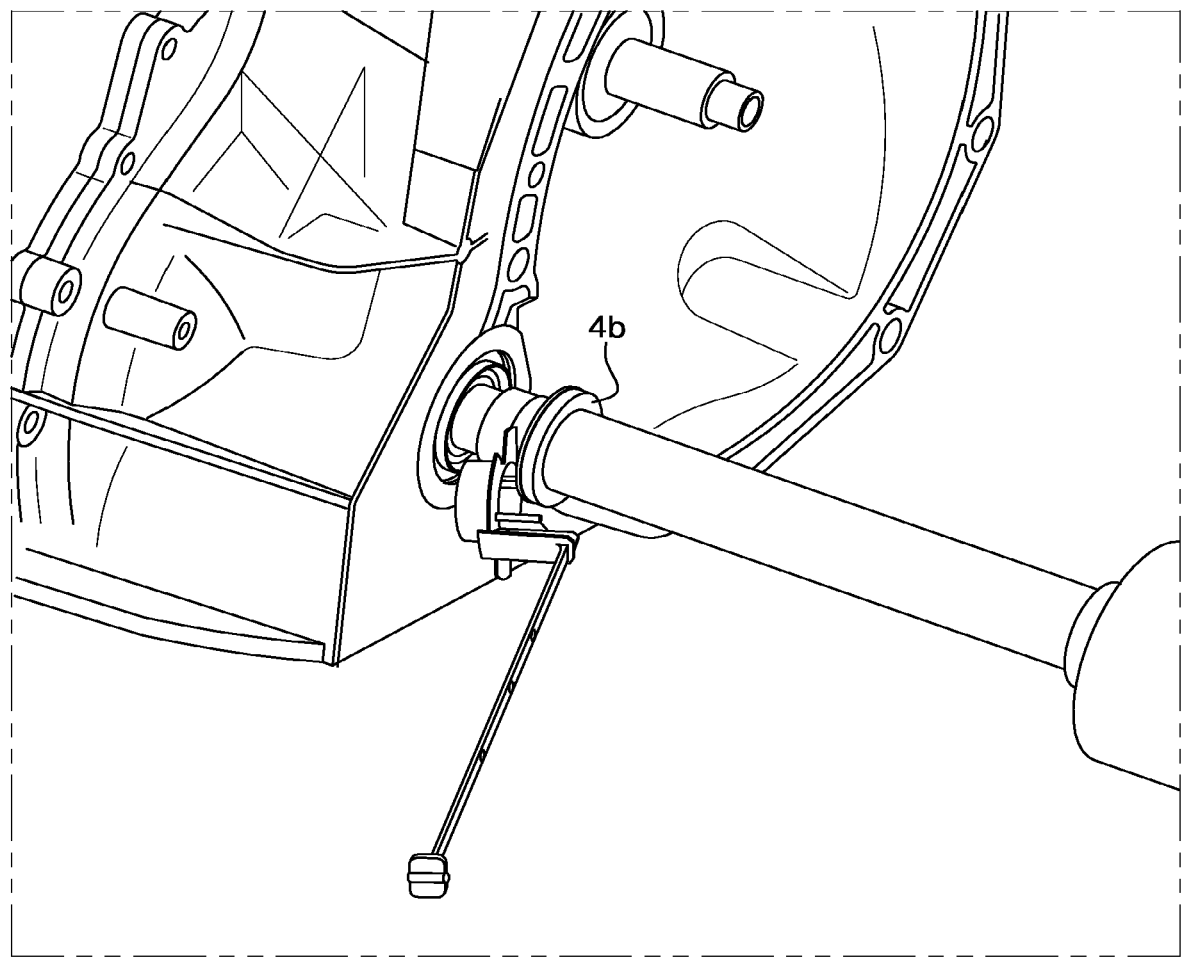
Figure 3D:
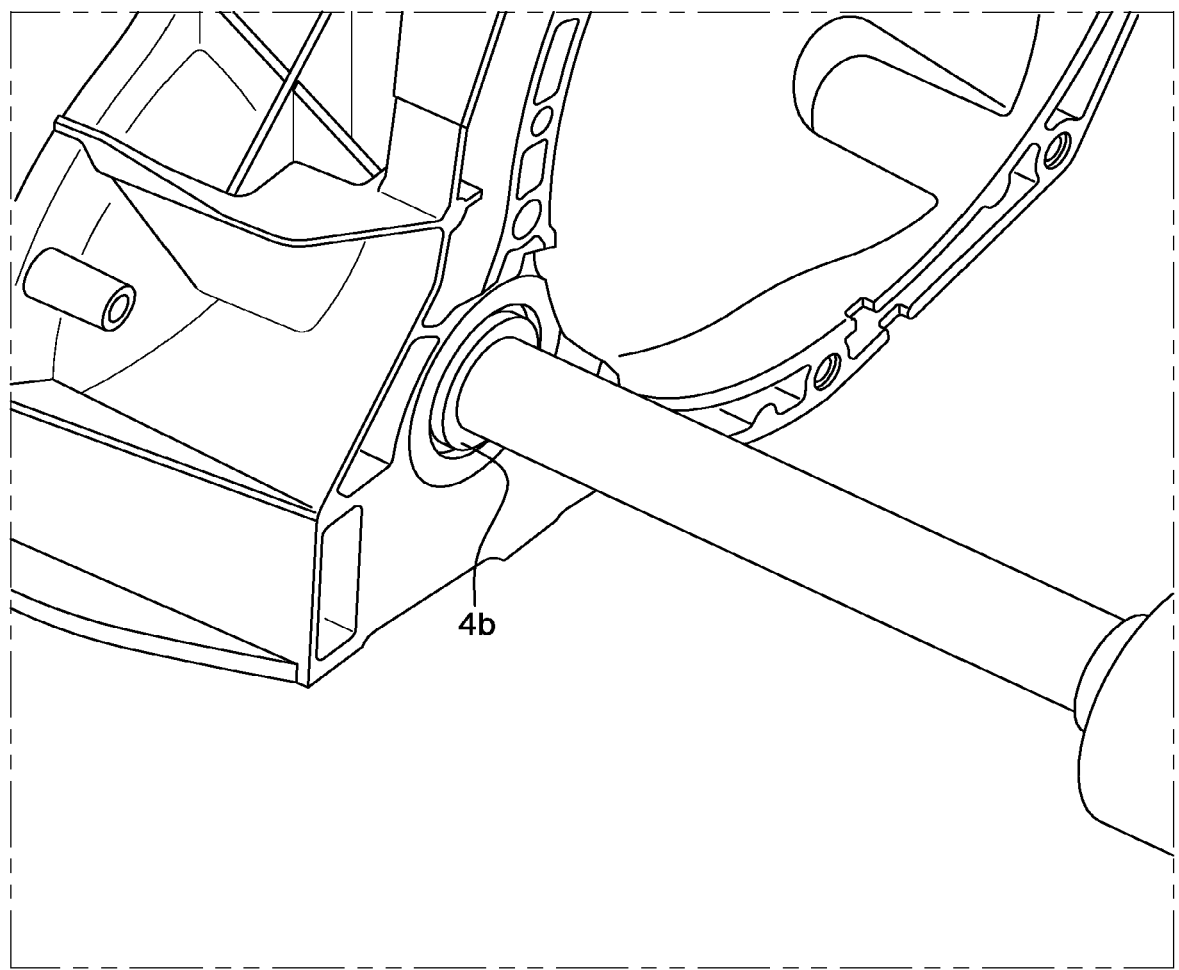

The operator pulls on the handle 7 so as to disengage the outer edge 9a from the collar 4b. By continuing to pull, he causes the device to pivot by bearing on the collar by way of the abutment. The opening 6a of the ring disengages from the shaft 4 in order to reach the position shown in FIG. 3C. Finally, once the device has been removed, the operator can continue to introduce the transmission shaft without damaging the seal until the collar 4b is brought into bearing contact with the case 1. In this position, the shaft is completely engaged in the differential and can transmit its movement to the wheels of the vehicle.

The method of mounting a transmission shaft with such a device can thus comprise the following main steps:
 placing the device under the transmission seal,
 inserting the transmission shaft as far as a reference position,
 removing the protection device by pulling on the handle.

In this method, the abutment of the protection device is disengaged from the collar 4a by pivoting against the case 1 while pulling on the handle in the direction of the case. After the disengagement of the abutment, the device is removed by pulling on the handle 7 away from the case 1.

The invention claimed is:

1. A removable protection device for a transmission seal providing tightness between a differential case and a transmission shaft inserted therein during mounting, the protection device comprising:
 a longitudinally slotted cylindrical protection ring that is introduced under the seal to protect the seal during the insertion of the shaft,
 an annular bearing flange that bears on the case, the annular flange being connected to the ring and having a radial opening following a slot of the ring and a lug that extends radially outside of the ring,
 a removal handle, and
 an abutment including an inner edge directly attached to the annular flange, the abutment projecting axially from the annular flange and having an outer edge that is opposite to the inner edge in an axial direction, the removal handle being directly attached to the outer edge of the abutment,
 wherein, when the transmission is inserted into the differential case, the abutment directly contacts a collar of the transmission shaft and the lug directly contacts the case to arrest the insertion of the shaft in a reference position in which splines of the transmission shaft have passed beyond the transmission seal, the protection device being removed from the transmission shaft by pulling the handle towards the case to pivot the protection device against the case until the abutment is disengaged from the collar.

2. A method for mounting a transmission shaft with a protection device, the method comprising:
 placing the protection device under transmission seal, the protection device comprising a longitudinally slotted cylindrical protection ring, an annular bearing flange connected to the ring and having a radial opening following a slot of the ring and a lug that extends radially outside of the ring, a removal handle, and an abutment projecting axially from the annular flange at an inner edge of the abutment, the removal handle being directly attached to an outer edge of the abutment that is opposite to the inner edge in an axial direction;
 inserting the transmission shaft into a differential case as far as a reference position which is reached when a collar of the shaft directly abuts the outer edge of the abutment and the lug directly contacts the case, the reference being reached when splines of the transmission shaft have passed beyond the transmission seal; and
 removing, once the transmission shaft reaches the reference position, the protection device by pulling on the handle to pivot the protection device against the case until the abutment is disengaged from the collar.

3. The method for mounting a transmission shaft as claimed in claim 2, wherein the device is removed after the disengagement of the abutment by pulling on the handle away from the case.

4. A transmission, comprising:
 a differential case;
 a transmission shaft configured to be inserted into the differential case;
 a removable protection device for a transmission seal providing tightness between the differential case and the transmission shaft inserted therein during mounting, the protection device comprising:
  a longitudinally slotted cylindrical protection ring positioned under the seal to protect the seal during the insertion of the shaft,
  an annular bearing flange that abuts the case, the annular bearing flange being connected to the ring and having a radial opening following a slot of the ring and a lug that extends radially outside of the ring,
  a removal handle, and
  an abutment projecting axially toward an outside of the case from the annular flange,
 wherein the abutment includes an inner edge directly attached to the annular flange and the removal handle is directly attached to an outer edge of the abutment that is opposite to the inner edge in an axial direction, and
 wherein, when the transmission is inserted into the differential case, the abutment directly contacts a collar of the transmission shaft and the lug directly contacts the case to arrest the insertion of the shaft in a reference position in which splines of the transmission shaft have passed beyond the transmission seal, the protection device being removed from the transmission shaft by pulling the handle towards the case to pivot the protection device against the case until the abutment is disengaged from the collar.

\* \* \* \* \*